9075X
T. Ling,
Churn.
Patented Sept. 9. 1835.
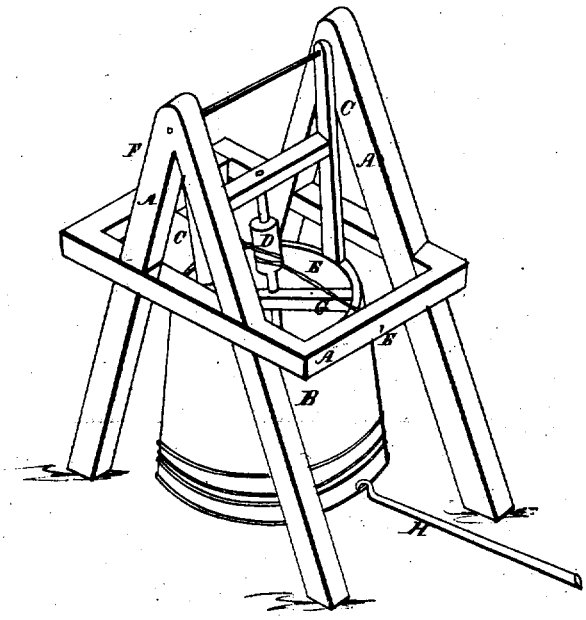
N. PETERS, PHOTO-LITHOGRAPHER, WASHINGTON, D. C.

90 75X  Sept. 9, 1835  217

Thomas Ling. Winthrop Kennebeck Co. Maine

Letters Patent

The Schedule referred to in these Letters Patent and making part of the same containing a description in the words of the said Thomas Ling himself of his Improvement in the Churn and Washing Machine To all to whom these Presents shall come. Be it known that I Thomas Ling of Winthrop in the County of Kennebeck and State of Maine have invented a new and useful improvement in the Churn and washing machine. and that the following is a full and exact description of the construction and operation of the said machine as invented or improved by me. reference being made to the accompanying plate A. A. A is the frame work. B is a churn or tub represented within the frame A. A. A. by the arms or uprights C.C. within the Churn is a dasher G. which is made by Cross pieces passing through the upright shaft D. where is a whirl or pulley made by an enlargement of the shaft. over this space D. passes a cord E. which goes round it once or twice and has each of its ends fastened onto the end pieces of the frame at F. F. The lower end of this shaft is a pivot fitting into a socket in the bottom of the churn or tub. H. is a rod or string attached by a hook to the bottom of the tub. Operation When you wish to operate with this Machine for churning or Washing nothing more is necessary than to pull the rod or string H. & thus cause the vessel B. to swing back and forth. by this swinging motion the dasher G is turned half way around one way and the other by the friction of the string E. For washing I have a larger or heavier dasher than for Churning and also made of a circular form Claims. What I specifically claim as my invention and for which I ask an exclusive right is the modification and combination of the swing or pendulum Churn and the dasher for Churning and washing as above specified — In testimony that the above 218. 9075X is a true Specification of my said Improvement as above described I have hereto set my hand this thirtieth day of July 1835.

Expl. Witnesses
Wm. C. Holmes
Saml B. Bunsar

Thomas Ling (Drawing)

[40 words]